US010103562B2

(12) United States Patent
Lee et al.

(10) Patent No.: US 10,103,562 B2
(45) Date of Patent: Oct. 16, 2018

(54) ELECTRONIC DEVICE AND METHOD FOR CONTROLLING CHARGING OPERATION OF BATTERY

(71) Applicants: Samsung Electronics Co., Ltd., Gyeonggi-do (KR); Korea Advanced Institute of Science and Technology, Daejeon (KR)

(72) Inventors: Byoung-Hee Lee, Gyeonggi-do (KR); Jae-Ii Baek, Daegu (KR); Shin-Young Cho, Seoul (KR); Sang-Wook Kwon, Gyeonggi-do (KR); Ki-Young Kim, Gyeonggi-do (KR); Bong-Chul Kim, Seoul (KR); Gun-Woo Moon, Daejeon (KR); Ji-Hoon Jung, Seoul (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 63 days.

(21) Appl. No.: 14/801,480

(22) Filed: Jul. 16, 2015

(65) Prior Publication Data

US 2016/0020620 A1 Jan. 21, 2016

(30) Foreign Application Priority Data

Jul. 16, 2014 (KR) ........................ 10-2014-0089675

(51) Int. Cl.
*H02J 7/04* (2006.01)
*H02J 7/16* (2006.01)
*H02J 7/00* (2006.01)

(52) U.S. Cl.
CPC ............ *H02J 7/0057* (2013.01); *H02J 7/008* (2013.01); *H02J 7/0075* (2013.01)

(58) Field of Classification Search
CPC ........ H02J 7/008; H02J 7/0073; H02J 7/0081; Y02E 60/12; H01M 10/44
USPC .......................................................... 320/162
See application file for complete search history.

(56) References Cited

U.S. PATENT DOCUMENTS 7,576,525 B2 8/2009 So et al.
RE43,911 E 1/2013 Matsuda et al.
2008/0303485 A1* 12/2008 Ng ..................... H01M 10/441 320/139
2009/0189569 A1* 7/2009 Hsu ....................... H02J 7/0072 320/160
2010/0033138 A1 2/2010 Alger et al.
2011/0156661 A1* 6/2011 Mehta .................. H02J 7/0073 320/160

OTHER PUBLICATIONS

Yi-Hwa Liu et al., Search for an Optimal Five-Step Charging Pattern for Li-Ion Batteries Using Consecutive Orthogonal Arrays, IEEE Transactions on Energy Conversion, vol. 26.

* cited by examiner

*Primary Examiner* — Arun Williams
(74) *Attorney, Agent, or Firm* — The Farrell Law Firm, P.C.

(57) ABSTRACT

The present invention relates to an electronic device and a method for controlling a charging operation of a battery. The charging control method includes charging a battery using a first charging mode, if a current voltage of the charged battery coincides with a predetermined voltage, decreasing an intensity level of a charging current and charging the battery using the decreased charging current intensity, and if the decreased charging current intensity coincides with a predetermined current intensity, converting from the first charging mode to a second charging mode and charging the battery using the second charging mode.

25 Claims, 11 Drawing Sheets

ELECTRONIC DEVICE AND METHOD FOR CONTROLLING CHARGING OPERATION OF BATTERY

PRIORITY

This application claims priority under 35 U.S.C. §119(a) to Korean Patent Application Serial No. 10-2014-0089675, which was filed in the Korean Intellectual Property Office on July 16, 2014, the entire disclosure of which is incorporated herein by reference.

BACKGROUND

1. Field of Invention

The present invention relates generally to an electronic device and a method for controlling a charging operation of a battery.

2. Description of Related Art

In general, methods of charging batteries include a method of charging a battery at a Constant Current (CC), a method of charging a battery at a Constant Voltage (CV), and a method of charging a battery at a Constant Power (CP). In addition, methods of charging batteries include a Constant Current-Constant Voltage (CC-CV) charging method of charging a battery by combining a constant current charging method and a constant voltage charging method, a multistage current charging method of charging a battery after varying the intensity of the constant current, and a boost (CV-CC-CV) charging method in which current larger than the Constant Voltage and the CC-CV charging method are combined with a constant voltage charging method.

FIG. 1 is a graph depicting a general relationship between voltage and electric charge as battery charging time passes.

Referring to FIG. 1, it can be seen that a maximum battery allowable current 110 decreases and an opened circuit voltage 120 increases as the battery is charged. When the battery is charged at a constant voltage, the battery may be automatically charged at a maximum allowable battery current. In this way, if the battery is charged at the maximum allowable battery current, the charging speed becomes faster. However, if the battery is charged at a high rate, the temperature of the battery rapidly increases due to a resistance component in the battery.

FIG. 2A is a graph depicting a change in the temperature of a battery according to the charging time corresponding to a maximum temperature in a multistage current charging section, according to the related art. FIG. 2B is a graph depicting a change in temperature of a battery according to a charging time corresponding to a maximum temperature in a constant voltage section, according to the related art.

Referring to FIG. 2A, a temperature rise occurs most significantly in a multistage current charging method, according to the related art, such that a temperature rise is unbalanced and the temperature of the battery decreases heavily when a constant voltage charging operation starts. Because current decreases in step form due to an unbalanced result caused by an asymmetric temperature, the temperature generated by a resistance component of the battery is significantly reduced as compared with a temperature generated by a change in entropy of the battery and a temperature transferred to the surrounding area such that the temperature rise is small and the maximum temperature point is generated in a multistage current charging section. However, in the case of an initial charging speed, because an average value of a charging current decreased in steps is smaller than a charging current decreased continuously, a charging time for the charging amount becomes longer than that illustrated in FIG. 2B.

Referring to FIG. 2B, because a temperature rise occurs most significantly in a constant voltage charging operation, an imbalance may be generated and a charging time may be reduced. Because a charging current becomes continuously smaller without being reduced in steps at an initial stage if an unbalance is generated, a temperature rise due to a resistance component of the battery becomes larger than that illustrated in FIG. 2A and a maximum temperature point is generated in a constant voltage section. However, an initial charging speed may be faster than that illustrated in FIG. 2A because an average charging current value is large.

In these conventional charging methods the temperature of the battery rises when the battery is charged in a multistage current charging section and a constant voltage section.

However, because increased temperatures which result when the battery is charged are rarely considered in the conventional charging methods, the temperature of the battery may rise significantly if the battery is charged at a high speed. The temperature rise may, as a result, affect peripheral devices.

Further, the internal temperature of the battery is far higher than the surface temperature of the battery. As a result, if the surface temperature of the battery is slightly increased, the internal temperature of the battery is significantly increased and, the life span of the battery abruptly decreases as the internal temperature rises.

Accordingly, it is necessary to optimize the temperature generated while the battery is charged.

SUMMARY

The present invention has been made to address at least the problems and disadvantages described above, and to provide at least the advantages described below.

Accordingly, an aspect of the present invention is to provide an electronic device and a method for controlling a charging operation of the battery.

Accordingly, an aspect of the present invention is to optimize the temperature generated while the battery is charged a high charging speed in a temperature rise range set by the user as compared with a constant current-constant voltage charging operation having the same average current.

In accordance with an aspect of the present invention, there is provided a charging control method of an electronic device including charging a battery using a first charge mode, if a current voltage of the charged battery coincides with a predetermined voltage, decreasing an intensity level of a charging current and charging the battery using the decreased charging current intensity, and if the decreased charging current intensity coincides with a predetermined current intensity, converting from the first charging mode to a second charging mode and charging the battery using the second charging mode.

In accordance with another aspect of the present invention, there is provided an electronic device that controls a charging operation, the electronic device including a battery and a controller. The controller charges the battery using a first charge mode, determines whether a current voltage of the charged battery coincides with a predetermined voltage, if the current voltage of the charged battery coincides with the predetermined voltage, decreases an intensity level of the charging current and charges the battery using the decreased charging current intensity, and if the decreased changing current intensity coincides with a predetermined current intensity, converts from the first charge mode to a second charging mode and charges the battery using the second charging mode.

In accordance with another aspect of the present invention, there is provided a non-transitory computer-readable storage medium that stores a program for executing a method of controlling a charging operation of an electronic device, the method includes charging a battery using a first charging mode, if a current voltage of the charged battery coincides with a predetermined voltage, decreasing an intensity level of a charging current and charging the battery using the decreased charging current intensity, and if the decreased charging current intensity coincides with a predetermined current intensity, converting from the first charging mode to a second charging mode and charging the battery using the second charging mode.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
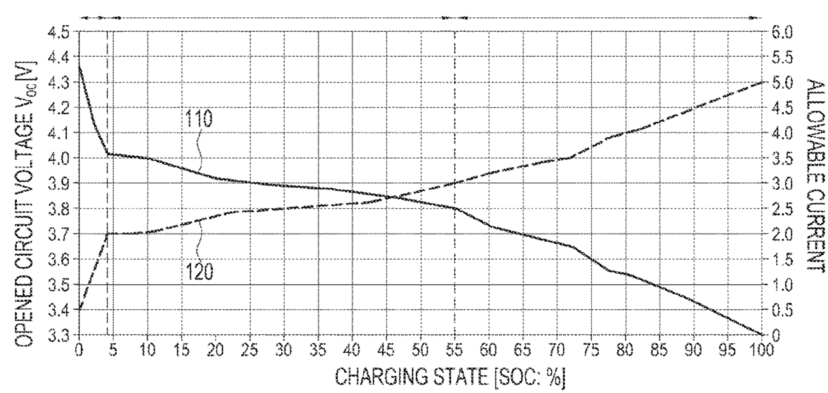
FIG. 1 is a graph depicting a general relationship between voltage and electric charge as battery charging time passes.

Hereinafter, the present invention will be described with reference to the accompanying drawings. The present invention may have various modifications and embodiments and thus will be described in detail with reference to specific embodiments illustrated in the drawings. However, it should be understood that there is no intent to limit the present invention to the particular forms disclosed herein; rather, the present invention should be construed to cover all modifications, equivalents, and/or alternatives falling within the spirit and scope of the invention. In the description of the drawings, identical or similar reference numerals are used to designate identical or similar elements.

In the present invention, the expression "include" or "may include" refers to existence of a corresponding function, operation, or element, and does not limit one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

In the present invention, the expression "or" includes any or all combinations of words enumerated together. For example, the expression "A or B" may include A, may include B, or may include both A and B.

In the present invention, expressions including ordinal numbers, such as "first" and "second," etc., may modify various elements. However, such elements are not limited by the above expressions. For example, the above expressions do not limit the sequence and/or importance of the corresponding elements. The above expressions may be used merely for the purpose of distinguishing one element from the other elements. For example, a first user device and a second user device indicate different user devices although both are user devices. For example, a first element may be termed a second element, and similarly, a second element may be termed a first element without departing from the scope of the present invention.

When an element is referred to as being "coupled" or "connected" to any other element, it should be understood that not only may the element may be directly coupled or connected to the other element, but also a third element may be interposed between the two elements. Contrarily, when an element is referred to as being "directly coupled" or "directly connected" to any other element, it should be understood that no element is interposed between the two elements.

The terms used in the present invention are only used to describe specific embodiments, and are not intended to limit the present invention. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meaning equal to the contextual meaning in the relevant field of art, and are not to be interpreted to have ideal or excessively formal meaning unless clearly defined in the present invention.

An electronic device according to the present invention may be a device including a display control function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD), such as electronic glasses, electronic clothes, an electronic bracelet, an electronic necklace, an electronic appcessory, electronic tattoos, or a smartwatch).

According to some embodiments, the electronic device may be a smart home appliance with a display control function. The smart home appliances may include at least one of, for example, televisions, Digital Versatile Disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices such as a Magnetic Resonance Angiography (MRA) scanner, a Magnetic Resonance Imaging (MRI) scanner, a Computed Tomography (CT) scanner, a scanner, an ultrasonograph, or the like, a navigation device, a Global Positioning System (GPS) receiver, an Event Data Recorder (EDR), a Flight Data Recorder (FDR), a vehicle infotainment device, electronic equipment for ship (for example, a ship navigation device and gyro-compass and the like), avionics, a security device, a head unit for vehicle, an industrial or household robot, ATM (Automatic Teller Machine) in banking facilities or POS (Point of Sale) systems in stores.

According to some embodiments, the electronic device may include at least one of a part of furniture or a building/structure having a display control function, an electronic board, an electronic signature receiving device, a projector, and various kinds of measuring instruments (e.g., a water meter, an electric meter, a gas meter, a radio wave meter, and the like).

According to some embodiments, the electronic device may include a device which transmits and receives data and performs a specific operation using biometric information. For example, a smartphone, a mobile phone, a notebook, a door lock, an air conditioner, a washing machine, a notepad PC, a tablet PC, and a smart TV.

The electronic device, according to the present invention, may be a combination of one or more of the aforementioned various devices. Also, the electronic device, according to the present invention, may be a flexible device. Further, it should be obvious to those skilled in the art that the electronic device, according to the present invention, is not limited to the aforementioned devices.

Herein, the term "user" may indicate a person using an electronic device or a device (e.g. an artificial intelligence electronic device) using an electronic device.

Figure 3:
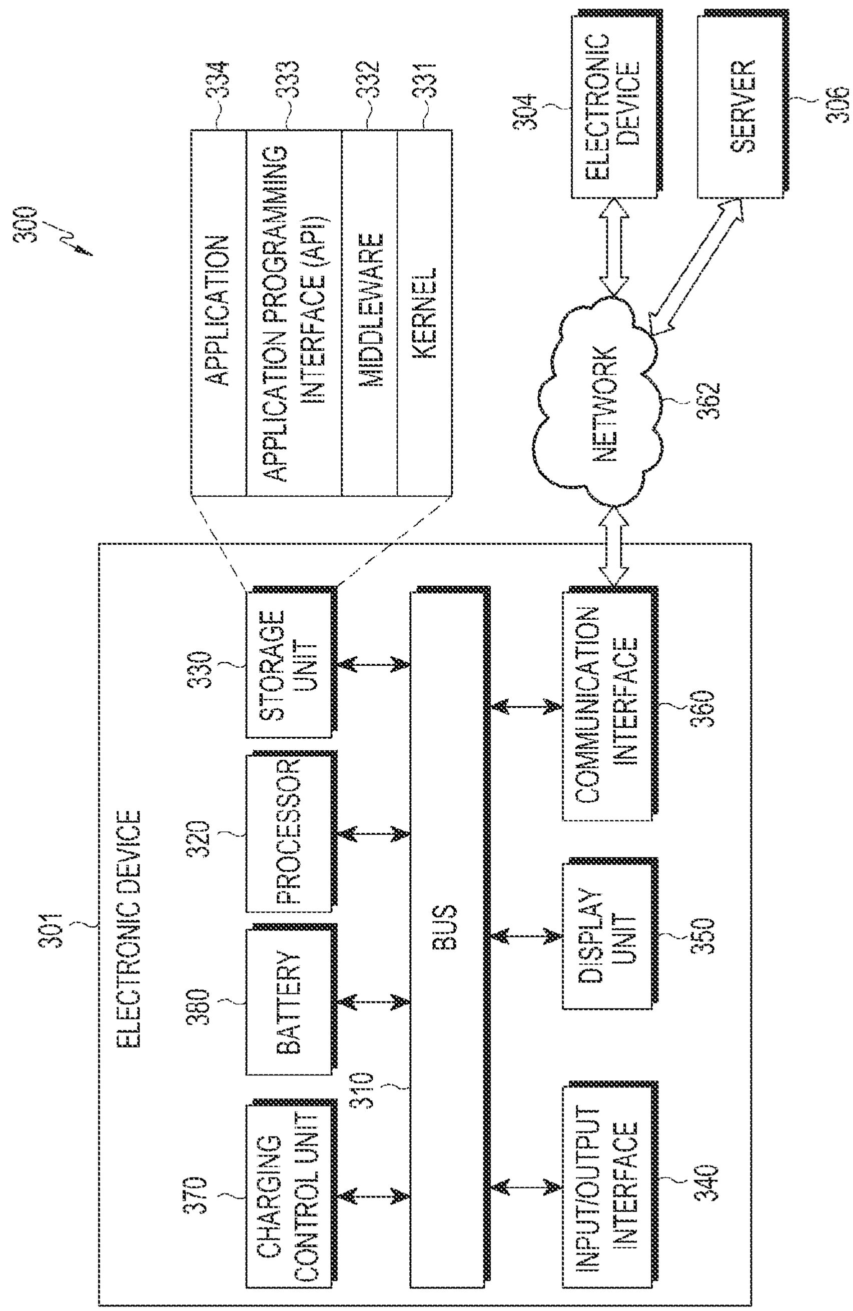
FIG. 3 illustrates a network environment including an electronic device, according to an embodiment of the present invention.

FIG. 3 illustrates a network environment including an electronic device, according to an embodiment of the present invention.

Referring to FIG. 3, the electronic device 301 includes a bus 310, a processor 320, a storage unit 330, an input/output interface 340, a display 350, a communication interface 360, a charging control unit 370, and a battery 380.

The bus 310 is a circuit for connecting the above-described elements with each other and transferring communication (for example, a control message) between the above-described elements.

The processor 320 receives a command from other components (for example, the storage unit 330, the input/output interface 340, the display 350, the communication interface 360, or the charging control unit 370) through the bus 310, deciphers the received command, and performs calculations or data processing according to the deciphered command.

The storage unit 330 stores a command or data received from the processor 320 or other elements (for example, the input/output interface 340, the display 350, the communication interface 360, and the charging control unit 370) or generated by the processor 320 or other elements. The storage unit 330 includes programming modules, for example, a kernel 331, middleware 332, an Application Programming Interface (API) 333, or an application 334. Each of the above-described programming modules may include software, firmware, hardware, or a combination of two or more thereof.

The kernel 331 controls or manages system resources (for example, the bus 310, the processor 320, and the storage unit 330) which are used in performing operations or functions implemented by other programming modules, for example, the middleware 332, the API 333 or the application 334. The kernel 331 provides an interface through which the middleware 332, the API 333, and the application 334 may access individual elements of the electronic device 301 to control or manage them.

The middleware 332 performs a relay function to allow the API 333 or the application 334 to communicate with the kernel 331 to exchange data. Further, in relation to requests for operation received from the application 334, the middleware 332 controls (for example, scheduling or load-balancing) the requests by using, for example, a method of determining a sequence for using system resources (for example, the bus 310, the processor 320, or the storage unit 330) of the electronic device 301 with respect to the application 334.

The API 333 is an interface by which the application 334 controls functions provided from the kernel 331 or the middleware 332, and includes, for example, at least one interface or function (for example, instructions) for file control, window control, image processing, or text control.

According to various embodiments, the application 334 may include a Short Message Service (SMS)/Multimedia Messaging Service (MMS) application, an email application, a calendar application, an alarm application, a health care application (for example, application measuring a quantity of exercise or blood sugar) or an application (for example, application providing information on pressure, humidity or temperature). Additionally or alternatively, the application 334 may be an application related to the exchange of information between the electronic device 301 and external electronic devices (for example, the external electronic device 304 and server 306). The application related to the exchange of information may include, for example, a notification relay application for transferring predetermined information to the external electronic device and a device management application for managing the external electronic device.

The notification relay application includes a function of transferring, to the external electronic device (for example, the external electronic device 304), notification information generated from other applications of the electronic device 301 (for example, an SMS/MMS application, an e-mail application, a health management application, an environmental information application, and the like). Additionally or alternatively, the notification relay application may receive notification information from, for example, the external electronic device 304 and provide the same to a user.

The device management application manages (for example, installs, removes, or updates) at least a part of functions (for example, turning on/off or controlling a brightness of the display) of the external electronic device 304 communicating with the electronic device 301, an application executed in the external electronic device 304, or a service (for example, call service or message service) provided by the external electronic device 304.

According to various embodiments, the application 334 includes an application designated according to an attribute (for example, the type of electronic device) of the external electronic device 304. For example, in a case where the external electronic device 304 is an MP3 player, the application 334 may include an application related to the reproduction of music. Similarly, when the external electronic device 304 is a mobile medical device, the application 334 may include an application related to health care.

The application 334 may include at least one of an application designated to the electronic device 301 and an application received from an external electronic device 304 or the server 306.

The input/output interface 340 transmits a command or data input from the user through an input/output device (for example, sensor, keyboard, or touch screen) to the processor 320, the storage unit 330, the communication interface 360, or the charging control unit 370, through, for example, the bus 310. For example, the input/output interface 340 may provide, to the processor 320, data for a user's touch input through the touch screen. The input/output interface 1140 may output a command or data received, through, for example, the bus 310, from the processor 320, the storage unit 330, the communication interface 360, or the charging control unit 370, through the input/output device (for example, a speaker or a display). For example, the input/output interface 340 may output voice data processed by the processor 320 to the user through the speaker.

The display 350 displays various pieces of information (for example, multimedia data or text data) to the user.

The communication interface 360 connects communication between the electronic device 301 and the electronic device 304 or the server 160. For example, the communication interface 360 communicates with the external electronic device 304 while being connected to a network 362 through wireless or wired communication.

The wireless communication includes for example, Wi-Fi, Bluetooth (BT), Near Field Communication (NFC), a Global Positioning System (GPS), and cellular communication (for example, Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)).

The wired communication includes for example, a Universal Serial Bus (USB), a High Definition Multimedia Interface (HDMI), Recommended Standard 232 (RS-232), and a Plain Old Telephone Service (POTS).

The network 362 is a telecommunication network. The communication network includes at least one of a computer network, the Internet, the Internet of Things (IoT), and a telephone network. According A protocol (for example, transport layer protocol, data link layer protocol, or physical layer protocol) for the communication between the electronic device 301 and the external electronic device 304 or server 306 may be supported by at least one of the application 334, the API 333, the middleware 332, the kernel 331, and the communication interface 360.

The server 306 may support the driving of the electronic device 301 by performing at least one of operations (or functions) implemented by the electronic device 301. For example, the server 306 may include a charging control server module for supporting the charging control unit 370 implemented in the electronic device 301. For example, the charging control server module may include one or more elements of the charging control unit 370, and performs (acts as a proxy for) at least one operation of the operations performed by the charging control unit 370.

The charging control unit 370 processes at least one of the information elements acquired by the other elements of the electronic device 301 (for example, the processor 320, the storage unit 330, the input/output interface 340, and the communication interface 360), and may provide the processed information elements to the user in various methods. For example, the charging control module 370 controls at least some functions of the electronic device 301, such that the electronic device 301 interworks with another electronic device (for example, the external electronic device 304 or the server 306) using the processor 320, or alternatively, independently from the processor 320. According to an embodiment of the present invention, at least one configuration of the charging control unit 370 may be included in the server 306, and at least one operation realized by the charging control unit 370 may be supported by the server 306. An additional information element on the charging control unit 370 is provided through FIGS. 4 to 11, which will be described below.

The battery 380 supplies electric power to the electronic device 301 under the control of the charging control unit 370. The battery 380 may supply electric power input from an external power source through a wired cable connected to the input/output interface 340 to the display unit 100.

Figure 4:
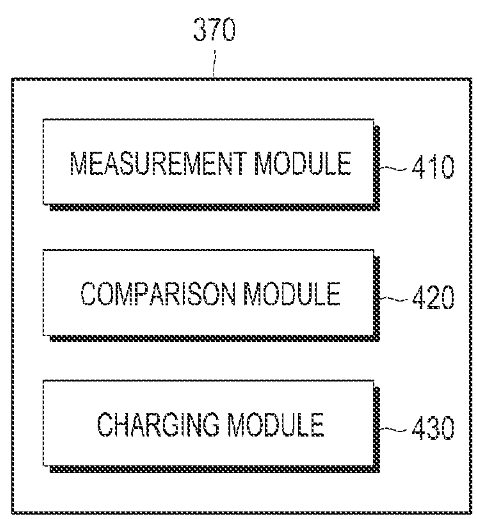
FIG. 4 is a block diagram illustrating a charging controller of an electronic device, according to an embodiment of the present invention.

FIG. 4 is a block diagram illustrating a charging controller of an electronic device, according to an embodiment of the present invention.

Referring to FIG. 4, the charging control unit 370 includes a measurement module 410, a comparison module 420, and a charging module 430.

The charging control unit 370 which charges the battery 380 included in the electronic device 301, may decrease the intensity level of a charging current when the current voltage of the charged battery 380 coincides with a predetermined voltage, and may convert the charging mode when the decreased current intensity is the same as the predetermined current intensity. The predetermined voltage may vary in correspondence to the decreased intensity level of the current. The predetermined voltage may vary according to the reduction of the intensity level of the current. For example, a plurality of predetermined voltages may be provided corresponding to the decreased intensity levels of the current. The predetermined voltage is a maximum allowable voltage of the battery 380. The decreased intensity level is an intensity obtained by decreasing the intensity of the charging current at a predetermined rate. The converted charging mode includes a mode for charging the battery 380 at a constant voltage. A time point when the mode is converted includes a time point when a value obtained by subtracting heat transferred to the surrounding area from a value obtained by adding heat generated by a resistance component of the battery 380 and heat generated by a change in entropy of the battery 380 is zero. The charging control unit 370 repeatedly performs a charging operation by decreasing an intensity level of the charging current until the decreased current intensity is the same as the predetermined current intensity. The charging control unit 370 sets the predetermined current intensity. The predetermined current intensity is an intensity of a current at a CV that corresponds to a temperature similar to a maximum temperature of the battery 380 while the battery 380 is charged at a CC. The charging control unit 370 completes the charging operation when the decreased intensity level is a minimum intensity level. The charging control unit 370 acquires a maximum allowable voltage and a maximum allowable current of the battery 380 by applying a current to the battery 380. The applied current may be several milliamps (mA) or less or several mA or more. In addition, the applied current according to the present invention is not be limited to several mA or less or several mA or more, but may have various values. Furthermore, the charging control unit 370 charges the battery 380 at a maximum allowable current, and the maximum allowable current is a maximum current instantaneously supplied to the battery 380.

The measurement module 410 measures at least one of a voltage and a current of the battery 380. The measurement module 410 measures at least one of the current voltage and current of the charged battery 380. When the battery 380 is charged after the intensity level of the charging current is decreased, the measurement module 410 measures the decreased current intensity.

The measurement module 410 additionally measures a maximum current instantaneously supplied to the battery 380, the temperature of the battery 380, heat generated by a resistance component of the battery 380,heat generated by a change in entropy of the battery 380, or measures heat transferred to the surrounding area of the battery 380. The measurement module 410 applies a current to the battery 380 to measure a maximum allowable voltage and a maximum allowable current of the battery 380. The maximum allowable current is a maximum current instantaneously supplied to the battery 380.

The measurement module 410 measures or calculates the temperature of the battery 380 through Equation (1), shown below.

$$C_{bat}dT_{bat}/d_t=Q_P+Q_S-Q_B \quad (1)$$

In Equation (1), $C_{bat}$ denotes a heat capacity of the battery 380, $dT_{bat}/d_t$ denotes a value obtained by differentiating a temperature($T_{bat}$) of the battery 380 in time axis, $Q_P$ denotes heat generated by a resistance component of the battery 380, $Q_S$ denotes heat generated by a change in entropy of the battery 380, and $Q_B$ denotes heat transferred to a surrounding area of the battery 380.

The measurement module 410 measures or calculates heat generated by a resistance component of the battery 380 through Equation (2), shown below.

$$Q_P=I_{ch}(V_{cc}-V_{oc})=I_{ch}^2R_n \quad (2)$$

In Equation (2), $I_{ch}$ denotes a charging current of the battery 380, $V_{cc}$ denotes a closed circuit voltage of the battery 380, $V_{oc}$ denotes an opened circuit voltage of the battery 380, and $R_n$ denotes an equivalent resistance of the battery 380.

The measurement module 410 measures or calculates heat generated by a change in the entropy of the battery 380 through Equation (3).

$$Q_S=-T_{bat}\Delta SI_{ch}/F=-T_{bat}dV_{oc}DTI_{ch} \quad (3)$$

In Equation (3), $T_{bat}$ denotes a temperature of the battery 380, ΔS denotes a change in the entropy of the battery 380 and is a value obtained by differentiating $V_{oc}$ in time axis, $I_{ch}$ denotes a charging current of the battery 380, F denotes a Faraday constant, and $V_{oc}$ denotes an opened circuit voltage of the battery 380.

The measurement module 410 measures or calculates heat transferred to a surrounding area of the battery 380 through Equation (4).

$$Q_B=Ah(T_{bat}-T_{amb})=AhT_{rising\_bat} \quad (4)$$

In Equation (4), A denotes a surface area of the battery 380, h denotes a heat transfer constant, $T_{bat}$ denotes a temperature of the battery 380, $T_{amb}$ denotes surrounding temperature, $T_{rising\_bat}$ denotes a rising temperature of the battery 380.

The comparison module 420 compares the current voltage of the charged battery 380 with a predetermined voltage, or determines whether the current voltage of the charged battery 380 coincides with the predetermined voltage. The comparison module 420 compares the intensity of the charged voltage after the intensity level of the current is decreased with the predetermined current intensity. The comparison module 420 determines whether the decreased current intensity coincides with the predetermined current intensity. When the battery 380 is charged after the intensity level of the charging current is decreased until the decreased current intensity coincides with the predetermined current intensity, the comparison module 420 compares the decreased current intensity with the predetermined current intensity.

The charging module 430 charges the battery. The charging module 430 further charges the battery 380 after decreasing the level of the charging current when the current voltage of the charged battery 380 coincides with a predetermined voltage. Furthermore, the charging module 430 converts the charging mode to charge the battery 380 when the decreased current intensity coincides with a predetermined current intensity. The charging module 430 charges the battery 380 after decreasing the intensity level of the charging current until the decreased current intensity is the same as a predetermined current intensity. The charging module 430 completes the charging operation when the decreased intensity level is a minimum intensity level. The charging module 430 applies a current to the battery 380 to acquire a maximum allowable voltage and a maximum allowable current of the battery 380. The charging module 430 charges the battery 380 at a maximum allowable current corresponding to a maximum current instantaneously supplied to the battery 380. When the charging mode is converted, the charging module 430 charges the battery 380 in the converted charging mode, and the converted charging mode includes the constant voltage charging mode.

Figure 5:
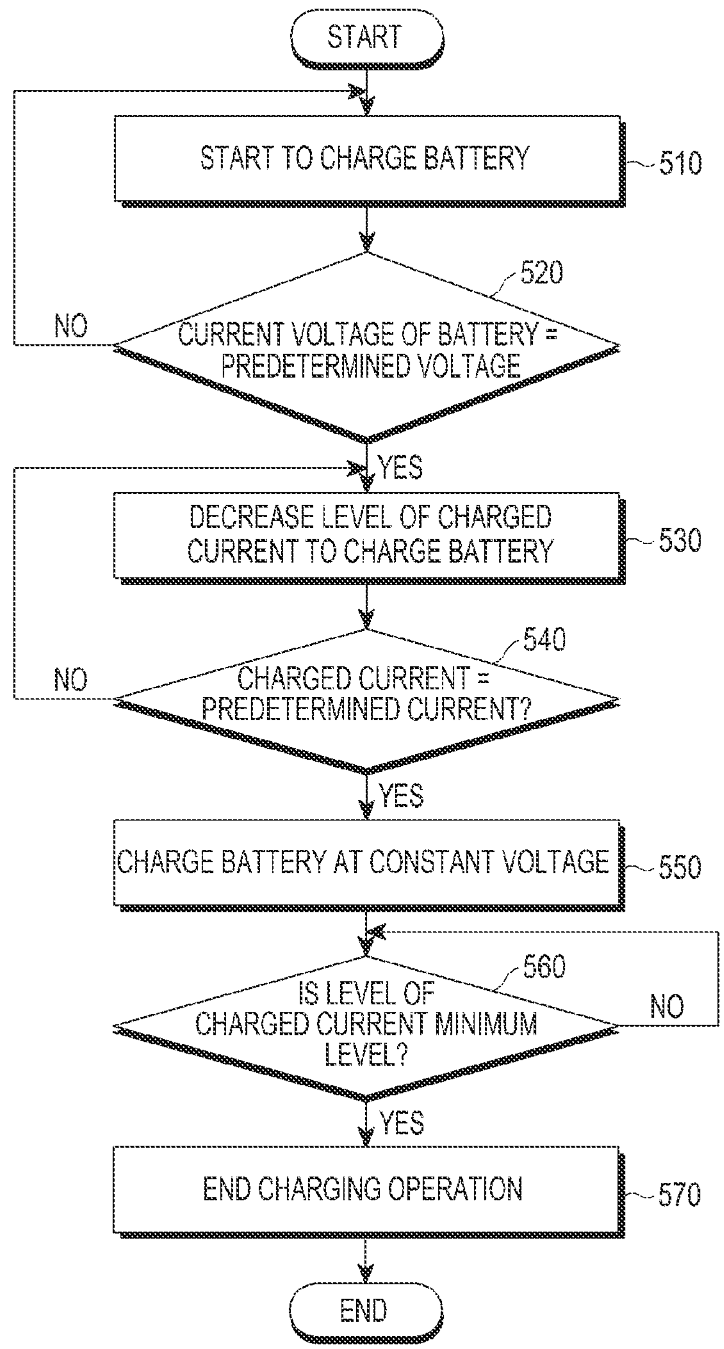
FIG. 5 is a flowchart illustrating a charging control process of an electronic device, according to an embodiment of the present invention.

FIG. 5 is a flowchart illustrating a charging control process of an electronic device, according to an embodiment of the present invention.

Referring to FIG. 5, at step 510, the electronic device 301 starts to charge the battery 380. The electronic device 301 acquires a maximum allowable voltage and a maximum allowable current of the battery 380 by applying a current to the battery 380. The electronic device 301 charges the battery 380 at the maximum allowable current, and the maximum allowable current includes a maximum current instantaneously supplied to the battery 380 The electronic device 301 determines and sets an intensity of a current at a CV corresponding to a temperature similar to the maximum temperature generated by the battery 380 while the battery 380 is charged at a constant current in advance.

In step 520, the electronic device 301 determines whether the current voltage of the battery 380 coincides with a predetermined voltage. When the current voltage coincides with the predetermined voltage, in step 530, the electronic device 301 charges the battery 380 after decreasing the intensity level of the charging current. The electronic device 301 measures the current voltage of the charged battery 380 in real time, and determines whether the current voltage measured in real time coincides with the predetermined voltage of the battery 380 in real time. The predetermined voltage may vary according to the reduction of the intensity level of the current. The predetermined voltage includes a maximum allowable voltage of the battery 380. The decreased intensity level is an intensity obtained by decreasing the intensity of the charging current at a predetermined rate. In step 540, the electronic device 301 repeatedly performs the charging operation by decreasing the intensity level of the charging current until the decreased current intensity is the same as the predetermined intensity of the current.

When the charging current is the same as the predetermined current , in step 550, the electronic device 301 charges the battery at a constant voltage. When the decreased current intensity is the same as a predetermined current intensity, the electronic device 301 charges the battery 380 after converting the charging mode into a constant voltage charging mode. The predetermined intensity of the current includes the intensity of a current at a CV that corresponds to a temperature similar to a maximum temperature of the battery 380 while the battery 380 is charged at a CC. The electronic device 301 converts the charging mode of the battery 380 into the constant voltage charging mode at a time point when a value obtained by subtracting heat transferred to the surrounding area from a value obtained by adding heat generated by a resistance component of the battery 380 and heat generated by a change in entropy of the battery 380 is zero.

The electronic device 301 calculates heat generated by a resistance component of the battery using Equation (5).

$$C_{bat}*dT_{bat}/d_t=Q_P+Q_S-Q_B \tag{5}$$

In Equation (5), $C_{bat}$ denotes a heat capacity of the battery 380, $dT_{bat}/d_t$ denotes a value obtained by differentiating a temperature of the battery 380 in time axis. $Q_P$ denotes heat generated by a resistance component of the battery 380, $Q_S$ denotes heat generated by a change in entropy of the battery 380, and $Q_B$ denotes heat transferred to a surrounding area of the battery 380.

The electronic device 301 measures or calculates heat generated by a resistance component of the battery 380 using Equation (6).

$$Q_P=I_{ch}(V_{cc}-V_{oc})=I_{ch}^2R_n \tag{6}$$

In Equation (6), $I_{ch}$ denotes a charging current of the battery 380, $V_{cc}$ denotes a closed circuit voltage of the battery 380, $V_{oc}$ denotes an opened circuit voltage of the battery 380, and $R_n$ denotes an equivalent resistance of the battery 380.

Equation (6) is an equation regarding heat generated by a charging current and a resistance of the battery 380, and corresponds to a positive value proportional to a square of the intensity of a current, irrespective of charging and discharging of the battery 380. For example, the temperature of the battery 380 increases if the current increases, and the temperature of the battery 380 rapidly rises if the battery 380 is charged at a maximum allowable current. For this reason the intensity of the current of the battery 380 may gradually decrease while the form of the current of the battery 380 remains similar to a maximum allowable current, by performing a multistage current charging operation at the initial stage of the charging operation.

The electronic device 301 measures or calculates heat generated by a change in entropy of the battery 380 using Equation (7).

$$Q_S=-T_{bat}\Delta SI_{ch}/F=-T_{bat}dV_{oc}/dTI_{ch} \tag{7}$$

In Equation (7), $T_{bat}$ denotes a temperature of the battery 380, ΔS denotes a change in the entropy of the battery 380 and is a value obtained by differentiating $V_{oc}$ in time axis, $I_{ch}$ denotes a charging current of the battery 380, F denotes a Faraday constant, and $V_{oc}$ denotes an opened circuit voltage of the battery 380.

Equation (7) corresponds to an equation regarding the entropy of the battery 380, and the value of Equation (7) corresponds to a negative value due to the definition of entropy. The temperature of the battery 380 is prevented from rising as the value of Equation (7) has a negative value during the charging operation, and the temperature of the battery 380 further rises as the value of Equation (7) has a positive value during a discharging operation.

The electronic device 301 measures or calculates heat generated by heat transferred to a surrounding area of the battery 380 using Equation (8).

$$Q_B=Ah(T_{bat}-T_{amb})=AhT_{rising\_bat} \tag{8}$$

In Equation (8), A denotes a surface area of the battery 380, h denotes a heat transfer constant, $T_{bat}$ denotes a temperature of the battery 380, $T_{amb}$ denotes surrounding temperature, $T_{rising\_bat}$ denotes a rising temperature of the battery 380.

Equation (8) is an equation for making the temperature of the battery 380 similar to the temperature of a surrounding, and may lower the value of Equation (8) if the temperature of the battery 380 is higher than the surrounding temperature and may increase the value of Equation (8) if the temperature of the battery 380 is higher than the surrounding temperature.

Figure 2A:
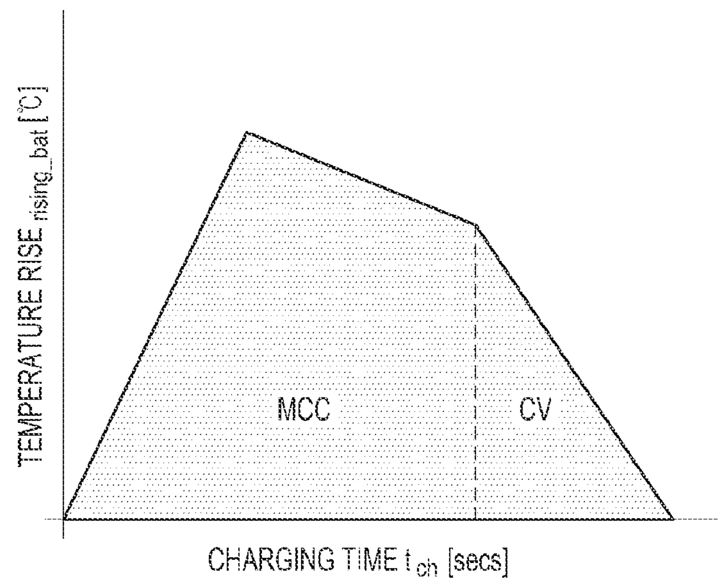
FIG. 2A is a graph depicting a change in temperature of a battery according to a charging time corresponding to a maximum temperature in a conventional multistage current charging section.
Figure 2B:
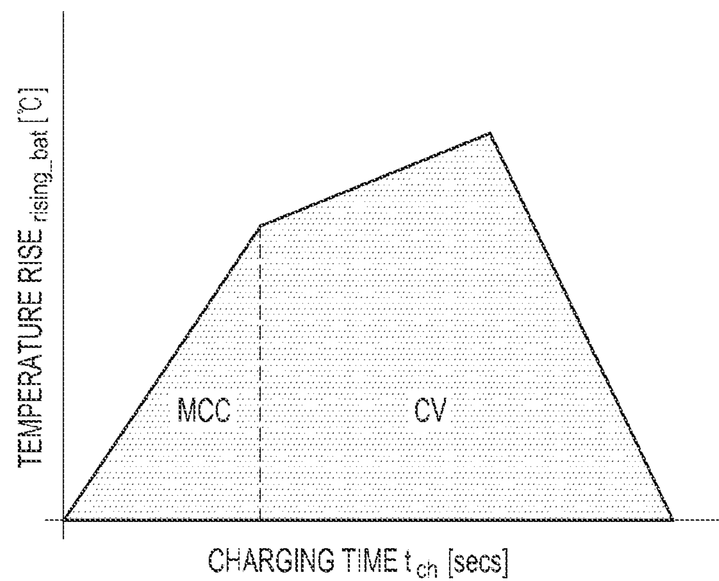
FIG. 2B is a graph depicting a change in temperature of a battery according to a charging time corresponding to a maximum temperature in a conventional constant voltage section.
Figure 6:
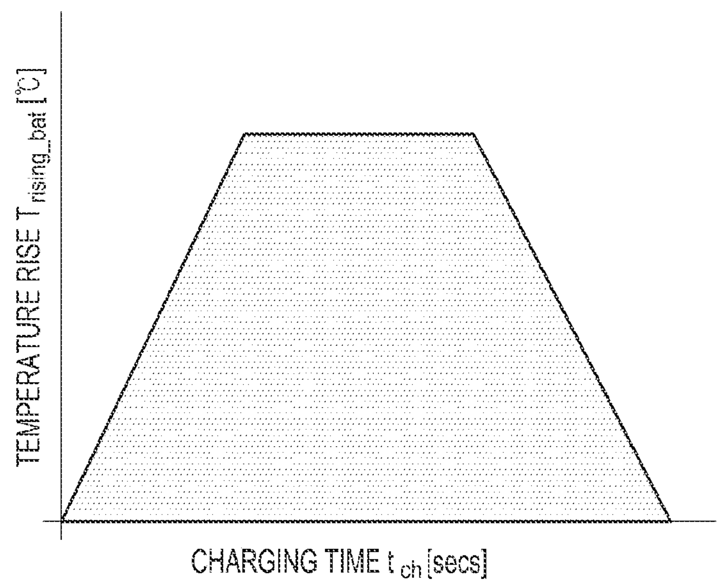
FIG. 6 is a graph depicting temperature of a battery based on a time when maximum temperatures of a multi-stage current charging section and a constant voltage charging section are identically maintained, according to an embodiment of the present invention.

In this way, the temperature of the battery 380 is determined using Equation (6) corresponding to heat emission due to resistance component, Equation (7) corresponding to entropy, and Equation (8) corresponding to heat transfer to the surrounding area, and maximum rising temperature can be reduced by inserting a section for maintaining a thermal equilibrium state into the charging state such that the graph for a battery charging rising temperature becomes a triangular form (as shown in FIGS. 2A and 2B) and a trapezoidal form (as shown in FIG. 6). Furthermore, in order to maintain a thermal equilibrium state, a maximum temperature of a multistage current charging section and a maximum temperature of a constant voltage charging section are combined to be the same, and the rising temperature graph may be a trapezoidal form through the combination.

As described above, if the battery 380 is charged, the voltage of the battery 380 gradually increases, and if the increasing voltage of the battery 380 reaches a predetermined voltage, the charging current is lowered to control rising of temperature. Using Equations (6) to (8), heat generated by a resistance component of the battery 38— (Equation (6)), heat generated by a change in entropy of the battery 380 (Equation (7)), and heat transferred to a surrounding area of the battery 380 (Equation (8)) are measured or calculated, and when the calculated values are combined to be zero (Equation (5)), the charging mode of the battery 380 is converted from a multistage current charging mode to a constant voltage charging mode. If temperature rises in the constant voltage charging mode, current charging speed becomes rapid but temperature increases, and if temperature lowers in the constant voltage charging mode, the current charging speed becomes slow, and the value of Equation (5) should be maintained at zero in the constant voltage charging mode. This is because the negative value of Equation (7) decreases as the heat in Equation (6) is reduced while charging current decreases, and it is possible to maintain the value of Equation (5) at zero.

When a temperature rise in Equations (6) and (7) is small and equilibrium energy to a surrounding area in Equation (8) is high as charging current decreases, temperature linearly decreases such that the temperature of the battery 380 is the same as a normal temperature. When the intensity level of the current charged in step 560 is a minimum intensity level, the electronic device 301 completes the charging operation 570. When the current voltage of the battery 380 is the same as the voltage of the battery 380 in step 510 while the battery is charged at a current corresponding to the minimum intensity level, the electronic device 301 determines that the charging operation is completed, and if the charging operation is completed, the charging operation is ended.

FIG. 6 is a graph depicting temperature of a battery based on a time when maximum temperatures of a multi-stage current charging section and a constant voltage charging section are identically maintained, according to an embodiment of the present invention.

Referring to FIG. 6, if the battery 380 starts to be charged, the temperature of the battery 380 increases. Furthermore, if the current voltage of the battery 380 coincides with a predetermined voltage, a uniform temperature can be maintained while the temperature of the battery 380 is not increased by repeatedly performing an operation of reducing the intensity level of the charging current to charge the battery 380. In addition, when the current battery current obtained by repeating an operation of decreasing the intensity level of the charging current to charge the battery 380 coincides with a predetermined current, the charging mode is converted into a charging mode such that the temperature of the battery 380 gradually decreases.

Figure 7A:
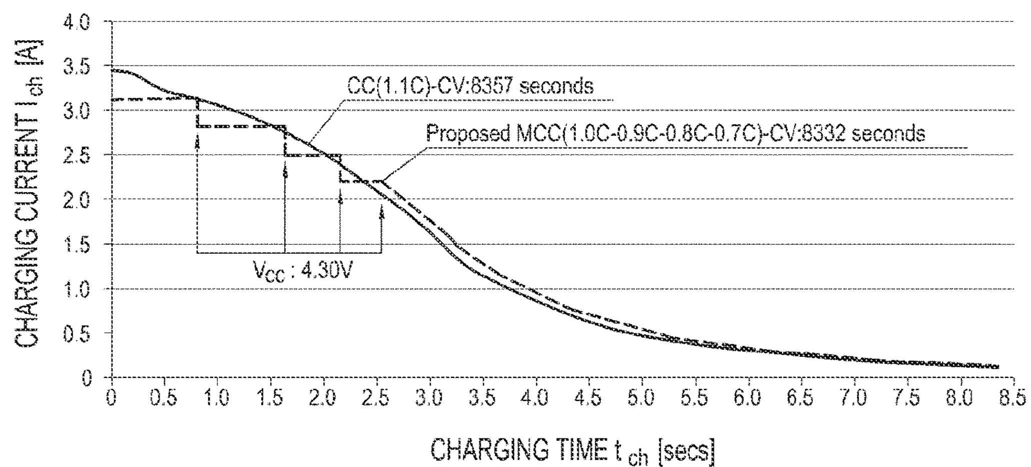
FIG. 7A is a graph depicting a result obtained by comparing a charging current based on a charging time when a maximum allowable voltage of a battery is 4.3 V, according to an embodiment of the present invention with the related art.
Figure 7B:
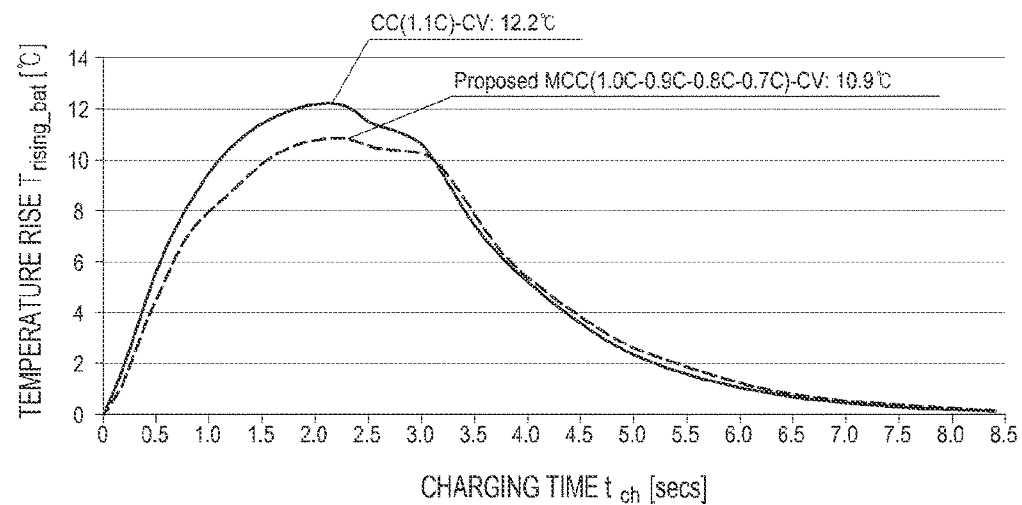
FIG. 7B is a graph depicting a result obtained by comparing a temperature rise based on a charging time when a maximum allowable voltage of a battery is 4.3 V, according to an embodiment of the present invention with the related art.

FIG. 7A is a graph depicting a result obtained by comparing a charging current based on a charging time when a maximum allowable voltage of a battery is 4.3 V, according to an embodiment of the present invention with the related art. FIG. 7B is a graph depicting a result obtained by comparing temperature rise depending on charging time when a maximum allowable voltage of a battery is 4.3 V according to an embodiment of the present invention with the related art.

FIGS. 7A and 7B represent an experimental result in which a battery is charged based on Table 1.

TABLE 1

| Phase | Point | 1.0 C | 0.9 C | 0.8 C | 0.7 C | 0.6 C | 0.5 C |
|---|---|---|---|---|---|---|---|
| CC | 4.3 V | 6.0° C. | 8.5° C. | 9.8° C. | 8.5° C. | 7.7° C. | 6.0° C. |
| CV | Tmax_bat | 12.1° C. | 11.5° C. | 10.5° C. | 9.0° C. | 8.3° C. | 6.0° C. |

Referring to FIGS. 7A and 7B, the reason the charging method according to the present invention is compared with a CC-CV charging method of 1.1 C, according to the related art, is that the average charging current values of the methods during the entire charging period are similar. In the experiment, the charging operation is started at 1.0 C (2800 mA) and the charging mode is converted from a multistage current charging mode to a constant voltage charging mode at 0.7 C (1960 mA). As illustrated in FIG. 7B, it can be seen that a charging speed at which the final charging time is similar to 1.1 C, can be obtained and the temperature rise is lower by 1.3 degrees. Furthermore, it can be seen that the form of the temperature graph is similar to a trapezoidal form through the charging method suggested by the present invention.

In Table 1, the second row represents a temperature in a constant current charging section from 0.5 C to 1.0 C when the voltage of the battery is 4.3 V, and the third row represents a maximum temperature of the battery in a constant voltage charging section. In order to obtain a graph having the form of FIG. 6 using Table 1, a current of a constant voltage section having a temperature that is similar to a value having the highest temperature in a constant current section. For example, because the highest temperature in the constant voltage section is 9.8° C., the temperature lower than and most similar to the highest temperature is 7° C. to 9° C. and 0.7° C. is set as a constant voltage starting current.

If the charging process is described with reference to Table 1, the battery 380 starts to be initially charged at 1.0 C (the lowest current of the charging current at which speed is saturated in the constant current-constant voltage charging method), and if the current voltage of the battery 380 reaches 4.3 V, the charging current is lowered from 1.0 C to 0.9 C. A process of lowering CCV to 4.3 V or less if the intensity level of the current is lowered to 0.9 C, and lowering the intensity of the current to 0.8 C again if the charging operation is resumed such that CCV reaches 4.3 V is repeatedly performed. Finally, if the battery 380 is charged such that the intensity level of the current becomes 0.7 C, CCV becomes 4.3 V, and the charging mode is converted from the multistage constant current charging mode to the constant voltage charging mode.

Figure 8A:
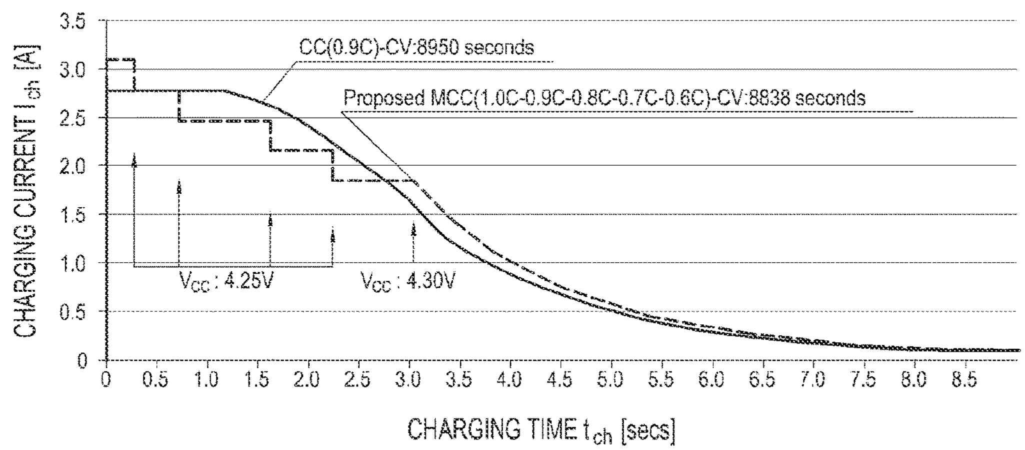
FIG. 8A is a graph depicting a result obtained by comparing a charging current depending on a charging time when a maximum allowable voltage of a battery is 4.25 V, according to an embodiment of the present invention with the related art.
Figure 8B:
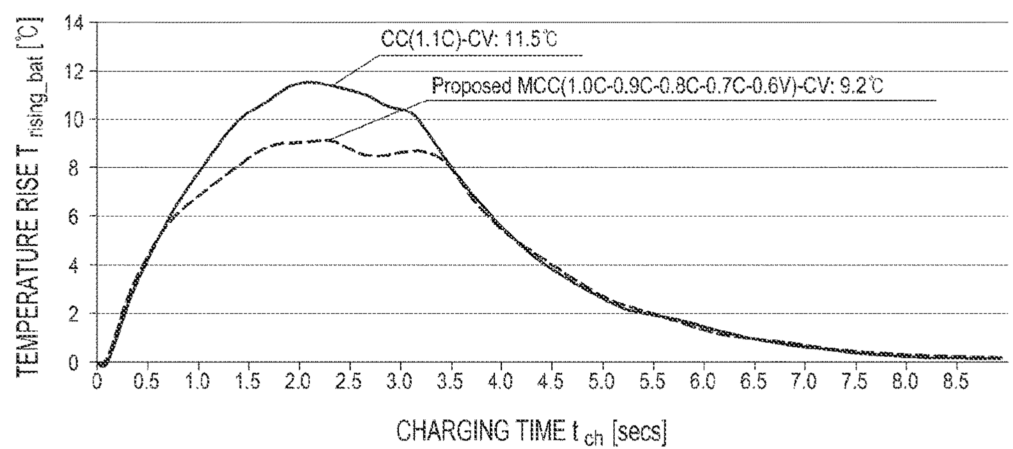
FIG. 8B is a graph depicting a result obtained by comparing a temperature rise depending on a charging time when a maximum allowable voltage of a battery is 4.25 V, according to an embodiment of the present invention with the related art.

FIG. 8A is a graph depicting a result obtained by comparing a charging current depending on a charging time when a maximum allowable voltage of a battery is 4.25 V, according to an embodiment of the present invention with the related art. FIG. 8B is a graph depicting a result obtained by comparing a temperature rise depending on a charging time when a maximum allowable voltage of a battery is 4.25 V, according to an embodiment of the present invention with the related art.

FIGS. 8A and 8B represent an experimental result in which the battery is charged based on Table 2.

TABLE 2

| Phase | Point | 1.0 C | 0.9 C | 0.8 C | 0.7 C | 0.6 C | 0.5 C |
|---|---|---|---|---|---|---|---|
| MCC | 4.25 V | 1.2° C. | 3.3° C. | 7.2° C. | 7.7° C. | 7.2° C. | 5.2° C. |
| CV | Tmax_bat | 12.1° C. | 11.5° C. | 10.5° C. | 9.0° C. | 8.3° C. | 6.0° C. |

Referring to FIGS. 8A and 8B, the reason the charging method according to the present invention is compared with a CC-CV charging method of 0.9 C according to the related art is that the average charging current values of the methods during the entire charging period are similar. In the experiment, the charging operation is started at 1.0 C and the charging mode is converted from a multistage current charging mode to a constant voltage charging mode at 0.6 C. As illustrated in FIG. 8B, it can be seen that a charging speed at which the final charging time is similar to 0.9 C can be obtained and the temperature rise is lower by 2.3 degrees. Furthermore, it can be seen that the form of the temperature graph is similar to a trapezoidal form through the charging method suggested by the present invention.

In Table 2, the second row represents a temperature in a constant current charging section from 0.5 C to 1.0 C when the voltage of the battery is 4.25 V, and the third row represents a maximum temperature of the battery in a constant voltage charging section.

Figure 9A:
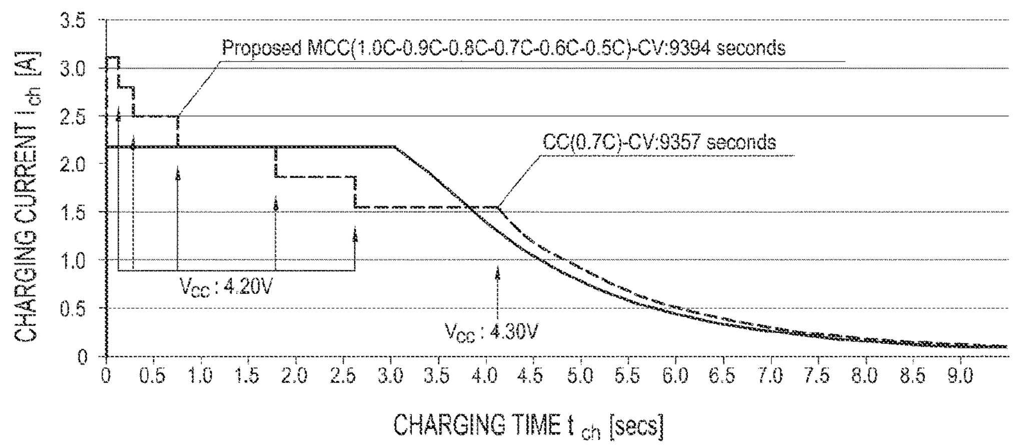
FIG. 9A is a graph depicting a result obtained by comparing a charging current depending on a charging time when a maximum allowable voltage of a battery is 4.20 V, according to an embodiment of the present invention with the related art.
Figure 9B:
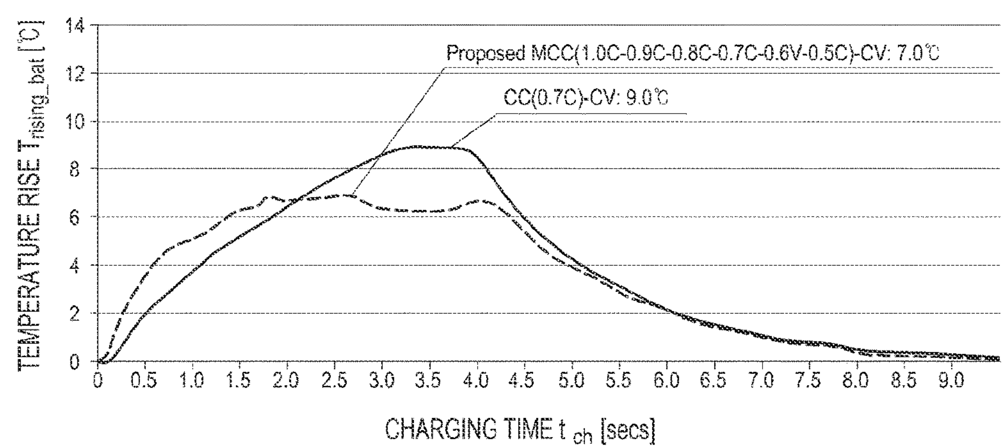
FIG. 9B is a graph depicting a result obtained by comparing a temperature rise depending on a charging time when a maximum allowable voltage of a battery is 4.20 V, according to an embodiment of the present invention with the related art.

FIG. 9A is a graph depicting a result obtained by comparing a charging current depending on a charging time when a maximum allowable voltage of a battery is 4.20 V, according to an embodiment of the present invention with the related art. FIG. 9B is a graph depicting a result obtained by comparing a temperature rise depending on a charging time when a maximum allowable voltage of a battery is 4.20 V, according to an embodiment of the present invention with the related art.

FIGS. 9A and 9B represent an experimental result in which the battery is charged based on Table 3.

TABLE 3

| Phase | Point | 1.0 C | 0.9.0 C | 0.8.0 C | 0.7.0 C | 0.6.0 C | 0.5.0 C |
|---|---|---|---|---|---|---|---|
| MCC | 4.20 V | 0.3° C. | 0.1° C. | 3.4° C. | 5.5° C. | 6.4° C. | 4.7° C. |
| CV | Tmax_bat | 12.1° C. | 11.5° C. | 10.5° C. | 9.0° C. | 8.3° C. | 6.0° C. |

Referring to FIGS. 9A and 9B, the reason the charging method according to the present invention was compared with a CC-CV charging method of 0.7 C according to the related art is that the average charging current values of the methods during the entire charging period are similar. In the experiment, the charging operation is started at 1.0 C and the charging mode is converted from a multistage current charging mode to a constant voltage charging mode at 0.5 C. As illustrated in FIG. 9B, it can be seen that a charging speed at which the final charging time is similar to 0.7 C can be obtained and the temperature rise is lower by 2 degrees. Furthermore, it can be seen that the form of the temperature graph is similar to a trapezoidal form through the charging method suggested by the present invention.

In Table 3, the second row represents a temperature in a constant current charging section from 0.5 C to 1.0 C when the voltage of the battery is 4.20 V, and the third row represents a maximum temperature of the battery in a constant voltage charging section.

Figure 10:
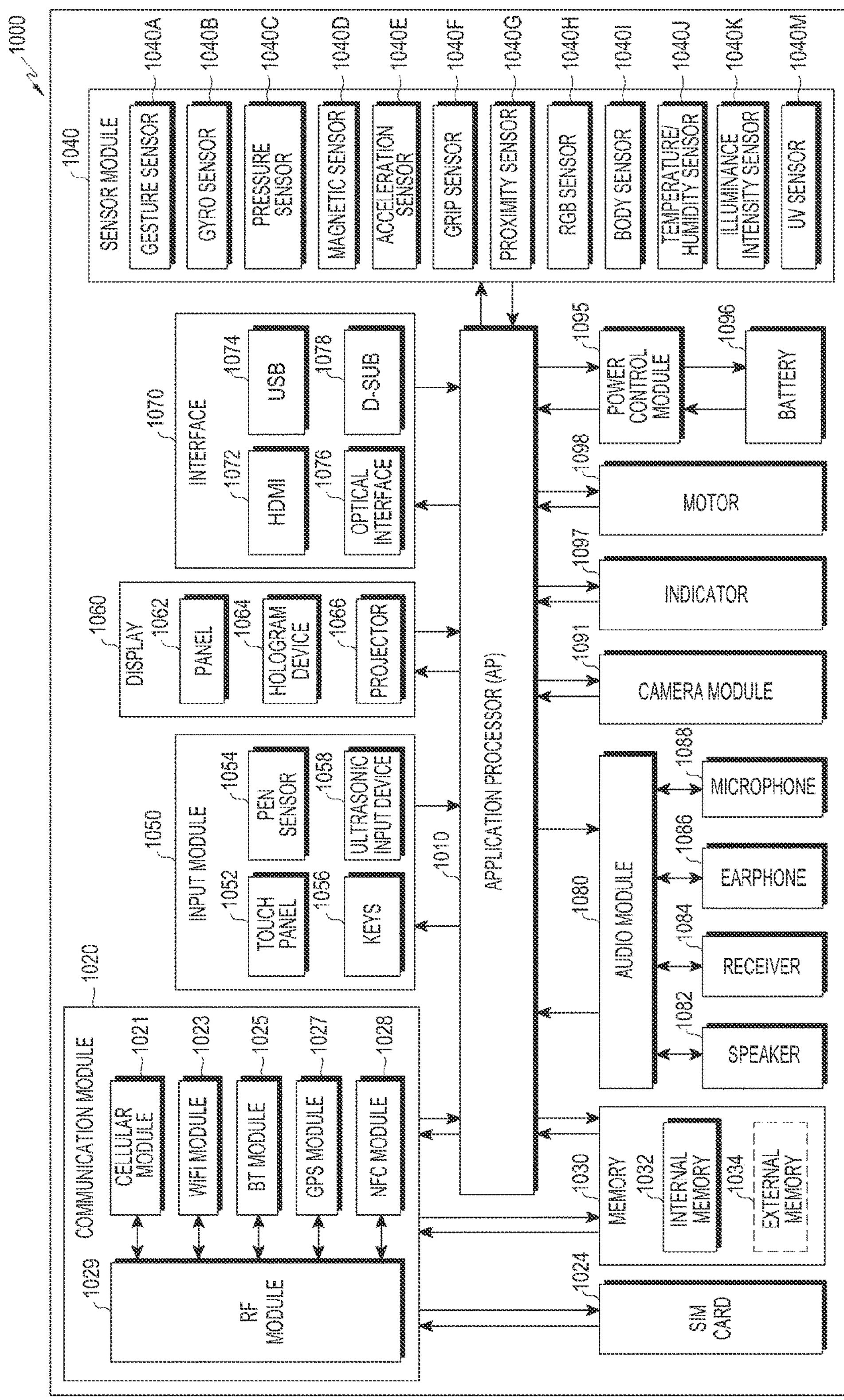
FIG. 10 is a block diagram illustrating an electronic device, according to an embodiment of the present invention.

FIG. 10 is a block diagram illustrating an electronic device, according to various embodiments of the present invention.

Referring to FIG. 10, an electronic device 1000 is provided. The electronic device 1000 may configure all or a part of the electronic device illustrated in FIG. 3. The electronic device 1000 includes at least one of an Application Processor (AP) 1010, a communication module 1020, a Subscriber Identifier Module (SIM) card 1024, a memory 1030, a sensor module 1040, an input module 1050, a display 1060, an interface 1070, an audio module 1080, a camera module 1091, a power control module 1095, a battery 1096, an indicator 1097, and a motor 1098.

The AP 1010 controls a plurality of hardware or software elements connected thereto by driving an operating system or an application program, processes various types of data including multimedia data, and performs calculations. The AP 1010 may be implemented by a System on Chip (SoC). The AP 1010 may further include a Graphic Processing Unit (GPU).

The communication module 1020 (for example, the communication interface 360) performs data transmission/reception in communication between the electronic device 1000 (for example, the electronic device 301) and other electronic devices (for example, the electronic device 304 and the server 306) connected thereto through a network (for example, network 362). The communication module 1020 includes a cellular module 1021, a Wi-Fi module 1023, a BT module 1025, a GPS module 1027, an NFC module 1028, and a Radio Frequency (RF) module 1029.

The cellular module 1021 provides a voice call, a video call, an SMS service, an Internet service, and the like through a communication network (for example, LTE, LTE-A, CDMA, WCDMA, UMTS, WiBro, or GSM). Also, the cellular module 1021 identifies and authenticates an electronic device in a communication network by using, for example, the SIM card 1024. The cellular module 1021 may perform at least some functions, which the AP 1010 can provide. For example, the cellular module 1021 may perform at least a part of the multimedia control function.

The cellular module 1021 may include a Communication Processor (CP). Furthermore, the cellular module 1021 may be implemented as an SoC. Although the components such as the cellular module 1021 (for example, a communication processor), the memory 1030, and the power control module 1095 are illustrated as components separate from the AP 1010 in FIG. 10, the AP 1010 may include at least some of the above-described components (for example, the cellular module 1010) according to one embodiment.

The AP 1010 or the cellular module 1021 (for example, a communication processor) may load, to a volatile memory, commands or data received from at least one of a non-volatile memory and other elements connected thereto, and may process the loaded commands or data. Furthermore, the AP 1010 or the cellular module 821 may store data received from at least one of other components or generated by at least one of other components in a non-volatile memory.

Each of the Wi-Fi module 1023, the BT module 1025, the GPS module 1027, or the NFC module 1028 may include a processor for processing data transmitted/received through the corresponding module. Although the cellular module 1021, the Wi-Fi module 1023, the BT module 1025, the GPS module 1027, and the NFC module 1028 are illustrated as individual blocks at least some (for example, two or more) of the cellular module 1021, the Wi-Fi module 1023, the BT module 1025, the GPS module 1027, and the NFC module 1028 may be included within one Integrated Chip (IC) or one IC package. For example, at least some of processors corresponding to the cellular module 1021, the WiFi module 1023, the BT module 1025, the GPS module 1027, and the NFC module 1028 respectively (for example, a CP corresponding to the cellular module 1021 and a WiFi processor corresponding to the WiFi module 1023) may be implemented as one SoC.

The RF module 1029 transmits/receives data, for example, an RF signal. The RF module 1029 may include a transceiver, a Power Amp Module (PAM), a frequency filter, or a Low Noise Amplifier (LNA). Furthermore, the RF module 1029 may include a component for transmitting/receiving electronic waves over a free air space in wireless communication, for example, a conductor, a conducting wire or the like. Although the cellular module 1021, the Wi-Fi module 1023, the BT module 1025, the GPS module 1027, and the NFC module 1028 are illustrated to share one RF module 3129 in FIG. 31, at least one of the cellular module 1029, the Wi-Fi module 1021, the BT module 1023, the GPS module 1025, and the NFC module 1027 may transmit/receive the RF signal through a separate RF module.

The SIM card 1024 is a card including a subscriber identification module and is inserted into a slot formed in a particular portion of the electronic device. The SIM card 1024 includes unique identification information (for example, an Integrated Circuit Card IDentifier (ICCID)) or subscriber information (for example, an International Mobile Subscriber IDentity (IMSI)).

The memory 1030 (for example, memory 330) includes an internal memory 1032 or an external memory 1034.

The internal memory 1032 includes at least one of a volatile memory (for example, a Dynamic Random Access Memory (DRAM), a Static RAM (SRAM), and a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory).

The internal memory 1032 may be a Solid State Drive (SSD).

The external memory 1034 may include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1034 may be functionally connected to the electronic device 1000 through various interfaces.

The electronic device 1000 may further include a storage device (or storage medium) such as a hard drive.

The sensor module 1040 measures a physical quantity or detects an operation state of the electronic device 1000, and converts the measured or detected information to an electrical signal. The sensor module 1040 may include, for example, at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (for example, Red, Green, Blue (RGB) sensor), a body (biometric) sensor 1040I, a temperature/humidity sensor 1040J, an illumination intensity sensor 1040K, and an Ultra Violet (UV) sensor 1040M.

Additionally or alternatively, the sensor module 1040 may include an E-nose sensor, an electromyography (EMG) sensor, an electroencephalogram (EEG) sensor, an electrocardiogram (ECG) sensor, an Infrared (IR) sensor, an iris sensor, a fingerprint sensor, and the like.

The sensor module 1040 may further include a control circuit for controlling at least one sensor pertaining to the sensor module 1040.

The input module 1050 may include a touch panel 1052, a (digital) pen sensor 1054, a key 1056, or an ultrasonic input device 1058.

The touch panel 1052 recognizes a touch input in at least one of, a capacitive type, a resistive type, an infrared type, and an acoustic wave type. The touch panel 1052 may further include a control circuit. In case of the capacitive type touch panel, physical contact or proximity recognition is possible. The touch panel 1052 may further include a tactile layer. In this case, the touch panel 1052 provides a tactile reaction to a user.

The (digital) pen sensor 1054 may be implemented, for example, using the same or similar method for receiving a user's touch input or, alternatively, may be implemented using a separate recognition sheet.

The key 1056 may include a physical button, an optical key, or a keypad.

The ultrasonic input device 1058 identifies data by generating an ultrasonic signal through an input tool (for example, pen) and detecting a sonic wave through a microphone (for example, microphone 1088) in the electronic device 1000, and is capable of wireless recognition.

The electronic device 1000 may also receive a user input from an external device (for example, a computer or server) connected thereto, using the communication module 1020.

The display 1060 (for example, the display unit 350) may include a panel 1062, a hologram device 1064, or a projector 1066.

The panel 1062 may be, for example, a Liquid Crystal Display (LCD) or an Active Matrix Organic Light Emitting Diode (AM-OLED). The panel 1062 may be implemented to be flexible, transparent, or wearable. The panel 1062 may also be configured as one module together with the touch panel 1052.

The hologram device 1064 displays a stereoscopic image in the air using interference of light.

The projector 1066 projects light onto a screen to display an image. For example, the screen may be located inside or outside the electronic device 1000. The display 1060 may further include a control circuit for controlling the panel 1062, the hologram device 1064, or the projector 1066.

The interface 1070 may include a High-Definition Multimedia Interface (HDMI) 1072, a Universal Serial Bus (USB) 1074, an optical interface 1076, or a D-subminiature (D-sub) 1078. The interface 1070 may be included in the communication interface 360 illustrated in FIG. 3. Additionally or alternatively, the interface 1070 may include a Mobile High-definition Link (MHL) interface, a Secure Digital (SD) card/Multi-Media Card (MMC) interface, or an Infrared Data Association (IrDA) standard interface.

The audio unit 1080 bilaterally converts a sound and an electronic signal. At least some elements of the audio unit 1080 may be included in, for example, the input/output interface 340 illustrated in FIG. 3. The audio unit 1080 processes voice information input or output through, for example, a speaker 1082, a receiver 1084, earphones 1086, or the microphone 1088.

The camera 1091 captures a still image or a video, and may include one or more image sensors (for example, a front sensor or a rear sensor), a lens, an Image Signal Processor (ISP), or a flash (for example, an LED or xenon lamp).

The power control module 1095 manages the power of the electronic device 1000. The power control module 1095 may include a Power Management Integrated Circuit (PMIC), a charger Integrated Circuit (IC), or a battery gauge.

The PMIC may be mounted to an integrated circuit or an SoC semiconductor. Charging methods may be classified into a wired charging method and a wireless charging method. The charger IC charges a battery and prevents over voltage or over current from a charger. The charger IC includes a charger IC for at least one of the wired charging method and the wireless charging method.

Examples of the wireless charging method include a magnetic resonance type, a magnetic induction type, or an electromagnetic wave type. An additional circuit for wireless charging, such as a coil loop circuit, a resonance circuit, or a rectifier circuit may be added.

The battery gauge measures the remaining amount of the battery 1096, a charging voltage and current, or temperature.

The battery 1096 stores or generates electricity and supplies power to the electronic device 1000 using the stored or generated electricity. The battery 1096 may include, for example, a rechargeable battery or a solar battery.

The indicator 1097 shows particular statuses of the electronic device 1000 or a part (for example, AP 1010) of the electronic device 1000, for example, a booting status, a message status, a charging status and the like.

The motor 1098 converts an electrical signal into mechanical vibration.

The electronic device 1000 may include a processing unit (for example, a GPU) for supporting mobile TV. The processing unit for supporting the mobile TV may process media data according to a standard of Digital Multimedia Broadcasting (DMB), Digital Video Broadcasting (DVB), media flow, or the like.

Each of the components of the electronic device according to the present invention is implemented by one or more components and the name of the corresponding component may vary depending on the type of the electronic device. The electronic device according to the present invention is configured by including at least one of the above-described elements, and some of the elements is omitted, or other elements is added. Further, some of the elements of the electronic device according to the present invention is combined to be one entity, which can perform the same functions as those of the components before the combination.

Figure 11:
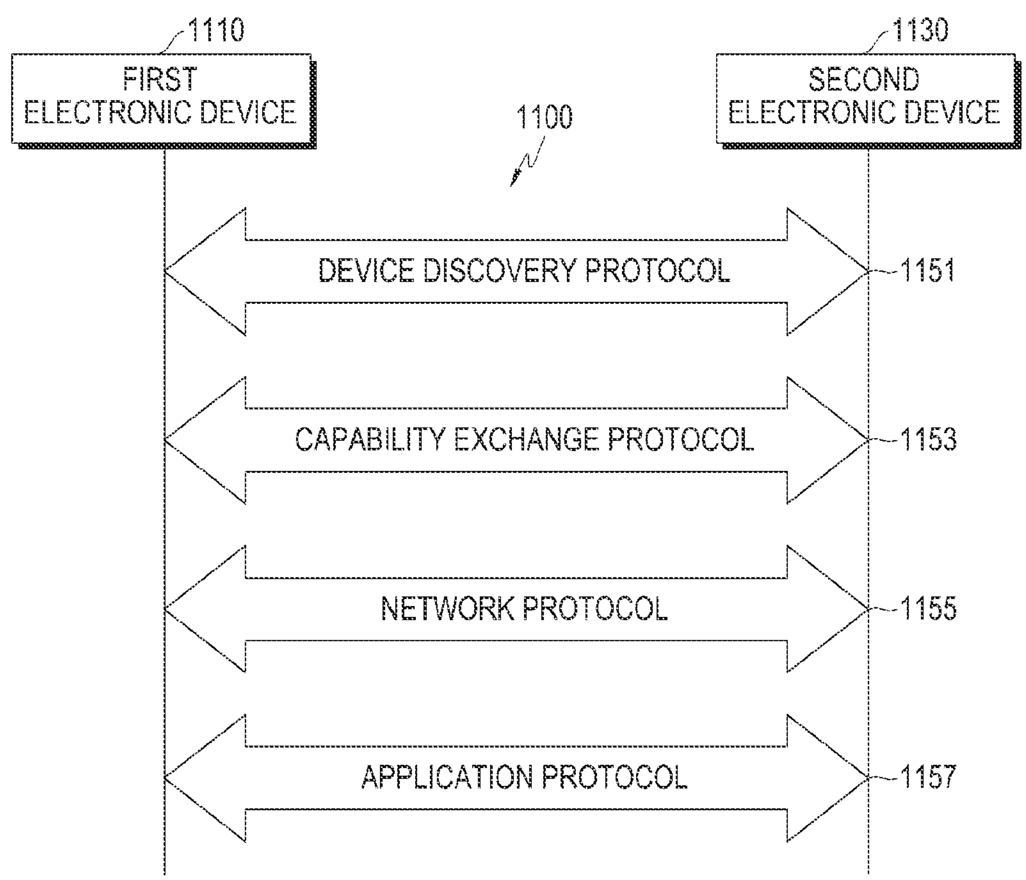
FIG. 11 illustrates a communication protocol between a plurality of electronic devices, according to an embodiment of the present invention.

FIG. 11 illustrates a communication protocol between a plurality of electronic devices, according to various embodiments of the present invention.

Referring to FIG. 11, a first electronic device 1110, a second electronic device 1130, and a communication protocol 1100 is provided.

The communication protocol 1100 includes a device discovery protocol 1151, a capability exchange protocol 1153, a network protocol 1155, and an application protocol 1157.

The device discovery protocol 1151 is a protocol that allows electronic devices (for example, a first electronic device 1110 or a second electronic device 1130) to detect an external electronic device that may directly communicate with the electronic devices or that allows the electronic device to be connected to the detected external device. For example, the first electronic device 1110 (for example, the electronic device 301) may detect the electronic device 1130 (for example, the external electronic device 304 or server 306) through a communication method (for example, WiFi, BT or a USB) that is used in the first electronic device 1110, using the device discovery protocol 1151. For a communication connection with the second electronic device 1130, the first electronic device 1110 acquires identification information of the second electronic device 1130 detected through the device discovery protocol 1151 and stores the acquired identification information. For example, the first electronic device 1110 may establish the communication connection with the second electronic device 1130 at least based on the identification information.

The device discovery protocol 1151 is a protocol for mutual authentication between a plurality of electronic devices. For example, the first electronic device 1110 performs an authentication between the first electronic device 1110 and the second electronic device 1130 based on communication information (for example, a Media Access Control (MAC) address, a Universally Unique IDentifier (UUID), a SubSystem IDentification (SSID), and an Information Provider (IP) address) for the connection with the first electronic device 1110.

The capability exchange protocol 1153 is a protocol for exchanging information related to a service function which is supported by at least one of the first electronic device 1110 and the second electronic device 1130. For example, the first electronic device 1110 or the second electronic device 1130 exchanges information related to a service function currently provided by each of the first electronic device 1010 and the second electronic device 1030 through the capability exchange protocol 1153. The exchangeable information includes identification information indicating a particular service among a plurality of services which can be supported by the first electronic device 1110 or the second electronic device 1130. For example, the first electronic device 1110 receives, from the second electronic device 1130, identification information of a particular service provided by the second electronic device 1130 through the capability exchange protocol 1053. In this case, the first electronic device 1110 determines whether the electronic device 1110 may support the particular service, based on the received identification information.

The network protocol 1155 is a protocol for controlling flows of data that are transmitted or received to provide, for example, a service between the electronic devices (for example, the first electronic device 1110 and the second electronic device 1130) connected to each other for communications. For example, at least one of the first electronic device 1110 and the second electronic device 1130 controls an error or data quality by using the data/session protocol 1155. Additionally or alternatively, the network protocol 1155 determines a transmission format of the data transmitted or received between the first electronic device 1110 and the second electronic device 1130. At least one of the first electronic device 1110 and the second electronic device 1130 manages at least one session (for example, connects or completes the session) for exchange of data using the network protocol 1155.

The application protocol 1157 is a protocol for providing a procedure or information for exchanging data related to a service provided to an external electronic device. For example, the first electronic device 1110 may provide the second electronic device 1130 with a service through the application protocol 1157.

The communication protocol 1100 includes a standard communication protocol, a communication protocol designated by an individual or organization (for example, a communication protocol self-designated by a communication device manufacturing company or a network supplying company), or a combination thereof. The term "module" used in the present invention may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

At least some of the devices (for example, modules or functions thereof) or the method (for example, operations) according to the present invention may be implemented by a command stored in a computer-readable storage medium in a programming module form. When the command is executed by one or more processors (for example, the processor 320), the one or more processors may execute a function corresponding to the command. The computer-readable storage medium may be the memory 330. At least some of the programming modules may be implemented or executed by the processor 320. At least some of the programming modules may include a module, a program, a routine, a set of instructions or a process for performing one or more functions.

The computer readable recording medium may include magnetic media such as a hard disc, a floppy disc, and a magnetic tape, optical media such as a Compact Disc Read Only Memory (CD-ROM) and a Digital Versatile Disc (DVD), magneto-optical media such as a floptical disk, and hardware devices specifically configured to store and execute program commands, such as a ROM, a Random Access Memory (RAM), and a flash memory. In addition, the program instructions may include high level language codes, which can be executed in a computer by using an interpreter, as well as machine codes made by a compiler. The aforementioned hardware device may be configured to operate as one or more software modules in order to perform the operation of the present invention, and vice versa.

The module or programming module according to an embodiment of the present invention may include one or more of the above-described elements. Alternatively, some of the above-described elements may be omitted from the programming module. Alternatively, the programming module may further include additional elements. Operations executed by a module, a programming module, or other component elements according to the present invention may be executed sequentially, in parallel, repeatedly, or in a heuristic manner. Further, some operations may be executed according to another order or may be omitted, or other operations may be added.

According to various embodiments of the present invention, there is provided a computer readable storage medium that stores a program comprising instructions for performing the method of the present invention.

The various embodiments disclosed in the specification and drawings are merely presented to easily describe the technical contents of the present invention and help the understanding of the present invention and are not intended to limit the scope of the present invention. Therefore, all changes or modifications derived from the technical idea of the present invention as well as the embodiments described herein should be interpreted to belong to the scope of the present invention. Therefore, the scope of the present invention is defined not by the detailed description and embodiments, but by the following claims and their equivalents.

What is claimed is:

1. A charging control method of an electronic device comprising:

acquiring an allowable voltage and an allowable current of a battery of the electronic device;

charging the battery using a first charging mode based on the acquired allowable voltage and the allowable current;

measuring a voltage of the battery;

determining whether the measured voltage corresponds to a predetermined voltage;

if the measured voltage corresponds to the predetermined voltage, converting the first charging mode into a second charging mode;

decreasing an intensity level of a charging current based on the second charging mode and charging the battery with the decreased charging current;

measuring heat associated with the battery while charging the battery with the decreased charging current ; and converting the second charging mode into a third charging mode based on the measured heat.

2. The charging control method of claim 1, wherein decreasing the intensity level of the charging current comprises decreasing the intensity level of the charging current until the decreased charging current coincides with a predetermined current.

3. The charging control method of claim 2, further comprising determining whether the decreased charging current coincides with the predetermined current, wherein the predetermined current is set in advance as a current at a constant voltage that corresponds to a temperature similar to a maximum temperature of the battery while the battery is charged at a constant current.

4. The charging control method of claim 1, further comprising, if the decreased intensity level is a minimum intensity level, completing the charging.

5. The charging control method of claim 1, wherein the predetermined voltage varies in correspondence to the decreased intensity level and comprises a maximum allowable voltage of the battery.

6. The charging control method of claim 1, further comprising applying a current into the battery to acquire a maximum allowable voltage and a maximum allowable current of the battery.

7. The charging control method of claim 6, wherein the battery is initially charged at the maximum allowable current, and the maximum allowable current is a maximum current instantaneously supplied to the battery.

8. The charging control method of claim 1, wherein the decreased intensity is an intensity obtained by decreasing the intensity of the charging current at a predetermined rate.

9. The charging control method of claim 1, wherein the third charging mode charges the battery at a constant voltage.

10. The charging control method of claim 1, wherein a time point if the second charging mode is converted to the third charging mode comprises a time point if a value obtained by subtracting heat transferred to a surrounding area from a value obtained by adding heat generated by a resistance component of the battery and heat generated by a change in entropy of the battery is zero.

11. The charging control method of claim 10, wherein the heat generated by the resistance component of the battery is calculated as:

$$C_{bat}*dT_{bat}/d_s\mathbf{32}\ Q_p+Q_s-Q_s$$

wherein, $C_{bat}$ at denotes a heat capacity of the battery, $dT_{bat}/d_t$ denotes a value obtained by differentiating a temperature of the battery in time axis, $Q_p$ denotes the heat generated by the resistance component of the battery, $Q_s$ denotes the heat generated by the change in the entropy of the battery, and $Q_B$ denotes the heat transferred to the surrounding area of the battery.

12. The charging control method of claim 10, wherein the heat generated by the resistance component of the battery ($Q_p$) is calculated as:

$$Q_p=I_{ch}(V_{cc}-V_{oc})=I_{ch}^2R_n$$

wherein, $I_{ch}$ denotes a charging current of the battery, $V_{cc}$ denotes a closed circuit voltage of the battery, $V_{oc}$ denotes an opened circuit voltage of the battery, and $R_n$ denotes an equivalent resistance of the battery.

13. The charging control method of claim 10, wherein the heat generated by the change in the entropy of the battery ($Q_s$) is calculated as:

$$Q_s=-T_{bat}\Delta SI_{ch}/F=-T_{bat}dV_{oc}/dTI_{ch}$$

wherein, $T_{bat}$ denotes a temperature of the battery, $\Delta S$ denotes the change in the entropy of the battery and is a value obtained by differentiating $V_{oc}$ in time axis, $I_{ch}$ denotes a charging current of the battery, F denotes a Faraday constant, and $V_{oc}$ denotes an opened circuit voltage of the battery.

14. The charging control method of claim 10, wherein the heat transferred to the surrounding area of the battery ($Q_B$) is calculated as:

$$Q_B=Ah(T_{bat}-T_{amb})=AhT_{rising\_bat}$$

wherein, A denotes a surface area of the battery, h denotes a heat transfer constant, $T_{bat}$ denotes a temperature of the battery, $T_{amb}$ denotes a surrounding temperature, $T_{rising\_bat}$ denotes a rising temperature of the battery.

15. An electronic device that controls a charging operation, the electronic device comprising:

a battery; and a processor configured to:

acquire an allowable voltage and an allowable current of a battery of the electronic device, charge the battery using a first charging mode based on the acquired allowable voltage and the allowable current, measure a voltage of the battery, determine whether the measured voltage corresponds to a predetermined voltage, if the measured voltage corresponds to the predetermined voltage, convert the first charging mode into a second charging mode, decrease an intensity level of a charging current based on the second charging mode and charge the battery with the decreased charging current, measure heat associated with the battery while charging the battery with the decreased charging current, and convert the second charging mode into a third charging mode based on the measured heat.

16. The electronic device of claim 15, wherein decreasing the intensity level of the charging current comprises decreasing the intensity level of the charging current until the decreased charging current coincides with a predetermined current.

17. The electronic device of claim 16, wherein the processor is further configured to determine whether the decreased charging current coincides with the predetermined current, and wherein the predetermined current is set in advance as a current at a constant voltage that corresponds to a temperature similar to a maximum temperature of the battery while the battery is charged at a constant current.

18. The electronic device of claim 15, wherein if the decreased intensity level is a minimum intensity level, the processor completes the charging.

19. The electronic device of claim 15, wherein the processor applies a current into the battery to acquire a maximum allowable voltage and a maximum allowable current of the battery.

20. The electronic device of claim 19, wherein the battery is initially charged at the maximum allowable current, and the maximum allowable current is a maximum current instantaneously supplied to the battery.

21. The electronic device of claim 15, wherein the decreased charging intensity is an intensity obtained by decreasing the intensity of the charging current at a predetermined rate.

22. The electronic device of claim 15, wherein the third charging mode charges the battery at a constant voltage.

23. The electronic device of claim 15, wherein the processor converts from the second charging mode to the third charging mode at a time point if a value obtained by subtracting heat transferred to a surrounding area from a value obtained by adding heat generated by a resistance component of the battery and heat generated by a change in entropy of the battery is zero.

24. A non-transitory computer-readable storage medium that stores a program comprising instructions for executing a method of controlling a charging operation of an electronic device, the method comprising:

acquiring an allowable voltage and an allowable current of a battery of the electronic device;

charging the battery using a first charging mode based on the acquired allowable voltage and the allowable current;

determining whether a current voltage of the charged battery coincides with a predetermined voltage;

if the current voltage of the charged battery coincides with the predetermined voltage, converting from the first charging mode to a second charging mode;

decreasing an intensity level of a charging current based on the second charging mode and charging the battery using the decreased charging current intensity;

measuring heat associated with the battery while the battery is charged at the decreased charging current intensity; and converting from the second charging mode to a third charging mode based on the measured heat.

25. The non-transitory computer-readable storage medium of claim 24, wherein decreasing the intensity level of the charging current comprises decreasing the intensity level of the charging current until the decreased charging current intensity coincides with a predetermined current intensity.

* * * * *